UNITED STATES PATENT OFFICE.

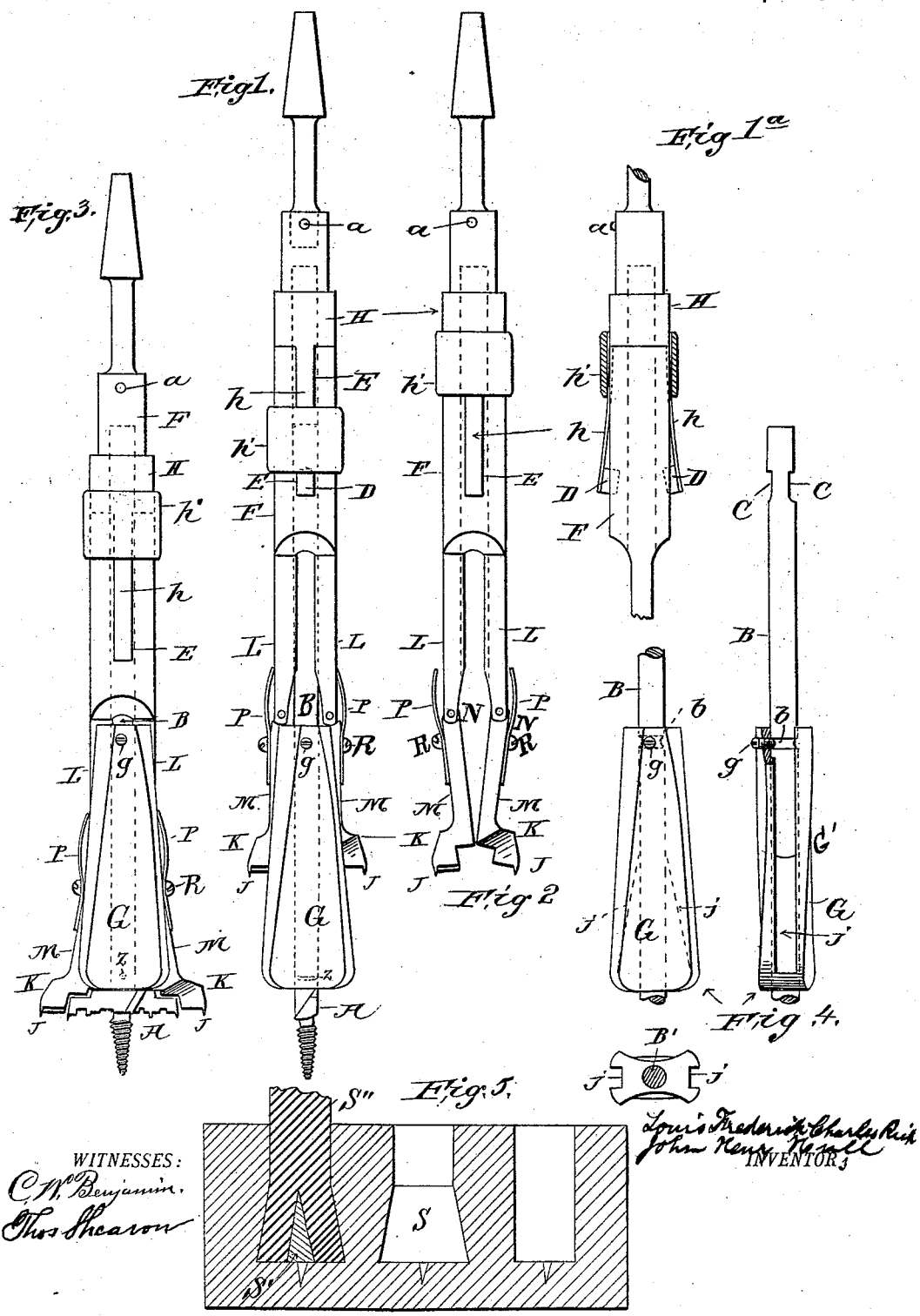

LOUIS FREDERICK CHARLES RICH AND JOHN HENRY HULL, OF NEW YORK, N. Y.

AUGER FOR BORING AND REAMING.

SPECIFICATION forming part of Letters Patent No. 529,049, dated November 13, 1894.

Application filed May 19, 1894. Serial No. 511,768. (No model.)

*To all whom it may concern:*

Be it known that we, LOUIS FREDERICK CHARLES RICH and JOHN HENRY HULL, of New York, in the county of New York and State of New York, have invented new and useful Improvements in Augers for Boring; and we do hereby declare the following to be a full, clear, and exact description of said invention, reference being had to the accompanying drawings, and to the letters of reference marked thereon, which form a part of this specification.

Our invention relates to improvements in tools of the class of augers, or other instruments for boring holes, and for gradually enlarging such holes at the bottom.

The invention consists in the use of a hollow cylinder for the auger, in which a spindle is inserted having at its lower end a horizontal cutter. The spindle is secured by catches as hereinafter described, while a hole is bored; and then allowed to remain stationary while the shell of the cylinder revolves carrying with it two reamers or vertical cutters, which are forced out gradually by passing down the slots cut in the form of inclined planes upon a guide, and the hole is thus made larger, increasing to the bottom. A cone or wedge is now inserted in the hole at the center of the bottom, and any tenon pressed down upon it is spread out into the enlarged diameter.

The drawings accompanying this application show the tool, in different views.

Figure 1 is the tool adjusted to bore a hole as with an ordinary auger and with the parts all assembled. Fig. 1ª shows the spring lugs D and a section of the retaining sleeve. Fig. 2 is the tool with taper, cutting edges separated from the spindle B and guide G. Fig. 3 shows the tool after the first cylindrical hole is bored, with the lugs released from the cavities in the spindle, allowing the tool to employ in use the reamers to widen the bottom of the hole. Fig. 4 shows the guide piece, which with its inclined planes compels the reamers as they descend its side to follow the slots and widen the hole. Fig. 5 shows the object and purpose of the tool in the widened hole with a cone or wedge inserted at the bottom of the widened hole and a tenon driven down upon which expands the tenon into the widened part and prevents it being withdrawn.

The cutting edge is shown at A Fig. 3 broken into several edges, or parts for the purpose of more easily dividing the fragments of wood and enabling their escape from the hole. In this condition the tool merely bores a cylindrical hole. Fig. 3 shows this cutting edge attached to a spindle B, and which is shown in Fig. 1 in position when the different parts of the tool are combined. At the upper end of the spindle are two cavities of flats, C.C. Fig. 4 which are used to prevent the spindle from turning around in its socket. This is effected by means of two catches or lugs D. D. Fig. 1ª which are pressed down into these cavities or flats through orifices E. E. Fig. 1 cut through the hollow cylinder F, in which the spindle is inserted, as in Fig. 1. When these catches or lugs are thus pressed down, the hollow cylinder and the spindle with cutting edges all revolve as one piece. To confine the catches or lugs in place we use a sleeve of metal $h'$ which slides up and down on the hollow cylinder and presses down, or releases the catches or lugs at will. The spindle passes through the center of a separate piece or guide G, and works easily in a hole bored through it, longitudinally. At the upper end of this guide a screw $g$ is inserted through one side and its end works in a groove $f$ cut around the circumference of the spindle and allows the spindle to revolve in this groove. The office of this groove is to hold the spindle in place when the tool is withdrawn from the hole after boring, and to pull out the guide with it. The catches or lugs are made of a separate tube of metal which encircles the hollow cylinder as shown at H, and are prolongations of this metal in two strips $h$ extending down the outside of the cylinder, but bent slightly so as to ply in and out as springs. They have at their ends two shoulders, or lugs D, D, which when pressed down catch on the spindle at the cavities C, C, and confine it from revolving unless as a part of the tool while boring. These catches are shown pressed down and held by the sleeve in Fig. 1, and in Fig. 3, they are shown raised up and thus allowing the spindle to revolve loosely in the guide G, without boring.

Fig. 3 shows the tool in the position it is after widening the hole, after it has been bored by the auger or spindle, in a cylinder shape, and after the hole is widened. In order to do this the sleeve is pushed up on the cylinder F, which releases the spindle from the catches or lugs D, D, and allows the spindle to revolve in the center of the guide G, and in the center of the cylinder. Its point then serves only to steady the guide. The tool is then revolved, and the spindle not being rigid bores no farther, but the cutters or reamers, beginning at the point shown at J, Fig. 1, to descend the slots or inclined planes $j$, Fig. 1$^a$, are forced outward, and as they descend these inclined planes, ream out the hole wider, finally stopping to descend just above the cutting edges of the auger, because the spindle B, which carries the guide is stopped by the end of the hollow cylinder at its top. The guide G is constructed with two inclined planes or slots cut in the sides in the manner shown at Fig. 1$^a$ where the dotted lines show the inclined planes. It is a separate piece of metal through which the spindle is inserted when the tool is put together. Its office is to guide, and force out, two cutters fashioned like the cutting edges of an auger as shown at J. These cutters or reamers are fastened to the end of the hollow cylinder which incloses the spindle and which end is prolonged as shown into two arms L, L. At the end of these arms are attached the two cutters, or reamers, M, M, which work on pivots N, N, Fig. 2, which hold them to the arms L, L, thus giving a free play in allowing them to expand by the action of the inclined places in the guide. In order to contract them within the wall of the cylindrical hole bored, and allow the tool to be withdrawn after the lower part of the walls of the hole are enlarged, these cutters have attached by a screw R, R, to each of their ends where they are pivoted to the arms L, L, a pistol spring P, P, which passes over the joint formed at the pivots and pressing against the arms L, L, forces the cutters to close together as the tool is withdrawn from the hole. Thus the passage of the cutters down the inclined planes forces them out, to ream out the walls of the hole, and as the tool is withdrawn from the hole the action of the springs forces the cutters to lie close to the inclined planes, and thus come inside the walls of the upper part of the hole. The hollow cylinder is shaped into a shank at the upper end or the shank may be inserted with a pin, $a$, and this is adjusted to the ordinary brace for boring holes.

In assembling the parts of the tool, the spindle B with its cutting ends, is first passed through the center of the guide G, and thus combined the end of the spindle is passed into the hollow cylinder F. The sleeve $h'$, is then passed down over the catches or lugs D, D, which presses these lugs into the cavities, or flats, C, C, and holds the spindle rigid. The tool is then in position to bore a cylindrical hole; and after this is bored, the sleeve is then passed on the cylinder, and the action of the spring in the catches, or lugs, releases the spindle and allows the tool to revolve without acting upon the spindle; and as pressure is exerted upon the tool, the reamers or cutters are forced down the inclined plane, and the revolution of the tool and the action of the cutters enlarges the hole as shown at S, Fig. 5, which represents the hole reamed out wider at the bottom. A cone or wedge S' is now placed in the bottom of the hole in the center, and as a chair rung, mallet handle, or any other object desired to be fixed immovably in a bored hole, is driven down on this cone, or wedge, the end inserted is spread for a short distance, and the parts forced out into the enlarged diameter as shown at Fig. 5 S''. Any object thus inserted and spread out by the cone, it is impossible to withdraw.

Wherever in manufactures, or building, a hole is bored to receive and hold anything inserted, by using this reaming tool the part inserted is immovably fixed. It can be used for furniture, wooden ware, iron fence posts, or rails, ship timbers, stone work, metal work or in any trade where an object is to be attached to another.

The sides of the guides are hollowed or milled as shown at G', into a slightly spiral form to allow the shavings to pass out. At B' is shown the spindle as it passes through the guide G. The cutter on the end of the spindle is attached by a pin at Z, Fig. 1 to the spindle, so as to use different sizes.

The tool is capable of being divided into two parts, and one part can be used for only enlarging holes without being used as a borer. This will enable any operator to use his own auger for boring a hole, and then using this tool to enlarge it at the bottom. The tool will then take a simpler form. The spindle can then be used without the cutters at the end, and have only a point to hold the tool in the center of the hole as bored.

The cutters or reamers can be attached to the arms or prolongations of the hollow cylinder by a double-joint instead of a single joint, thus enabling them to expand to a greater diameter.

By using guides of different sizes it is obvious the tool can be adapted to enlarge holes of different sizes.

The spindle is adjusted in its length to ascend into the hollow cylinder only so far as to allow the cutters or reamers to ream out to the bottom of the hole. Thus when the cutters reach the bottom of the hole, the end of the spindle has reached the end of the hollow cylinder.

Having now described our invention, what we claim is—

1. The combination of a spindle, a hollow cylinder movable longitudinally thereon and having a chuck or squared end or means of connection to a brace or boring machine, one or more reamers or cutters flexibly connected with the cylinder and capable of movement outwardly from the spindle, and a guide piece rotating with the cylinder, mounted on or carried by the spindle below the cylinder and having one or more ways with guide faces at an angle to the axis of the spindle that act to support and guide the reamers outwardly, whereby as the cylinder and reamers are rotated and fed the reamers are gradually forced outwardly from the spindle by the guide faces, substantially as and for the purpose set forth.

2. The combination of a spindle, a rotating cylinder movable longitudinally thereon, and adapted to be connected to a brace or boring machine, one or more reamers or cutters flexibly connected with the cylinder and capable of movement outwardly from the spindle, a guide piece mounted on the spindle below the cylinder, capable of rotation with the cylinder independently of the spindle and having one or more ways with guide faces at an angle to the axis of the spindle that act to support and guide the reamers outwardly, whereby as the cylinder and reamers are rotated and fed the reamers are gradually forced outwardly from the spindle by the guide faces, substantially as and for the purpose set forth.

3. The combination of a spindle having a boring cutter at its end, a rotating cylinder moving longitudinally on the spindle and adapted to be connected to a brace or boring machine, one or more reamers or cutters flexibly connected with a cylinder and capable of movement outwardly from the spindle, a guide piece mounted on the spindle at or near its boring end and rotating with the cylinder and having one or more ways with guide faces at an angle to the axis of the spindle that act to support and guide the reamers outwardly, and means for locking the spindle and cylinder to rotate together to bore a cylindrical hole with the cutter at the end of the spindle, and disconnecting the spindle and cylinder to permit the independent rotation of the cylinder, reamers and guide piece to ream out the sides of the cylindrical hole at the bottom, substantially as set forth.

4. A combined boring and reaming tool consisting of a borer for cutting a cylindrical hole, a guide piece mounted at the end thereof immediately above the cutter and capable of rotation independently of the borer and having one or more reamer guide ways with guiding surfaces at an angle to the axis of the borer, one or more reaming cutters working in said guide ways, a support or carrying piece to which the reamers are flexibly attached, and means for locking the parts to rotate together with the reamers out of action, to bore a cylindrical hole, and then disengaging the guide piece reamers and reamer support from the borer, whereby as said parts are rotated and fed the reamers are gradually forced outwardly to ream out the bottom part of the cylindrical hole.

5. A hollow cylinder having prolonged arms, and which arms have cutters or reamers attached to their ends, which cutters or reamers have a pistol-spring attached to them acting to force them together, in combination with a spindle which passes through the hollow cylinder longitudinally, and combined with a guide with inclined planes, or slots, cut into the sides for the passage of cutters or reamers, substantially as shown and described.

6. A hollow cylinder having prolonged arms, and which arms have cutters or reamers attached to their ends, which cutters or reamers have a pistol spring attached to them acting to force them together, in combination with a spindle which passes through the hollow cylinder longitudinally, and is held rigid while boring by the action of two lugs, or catches attached to arms, or prolongations of a tube encircling the cylinder, and which lugs, or catches pass through orifices in the hollow cylinder, and are pressed into flats or cavities in the spindle, and held there by a sleeve, and combined with a guide with inclined planes, or slots cut into the sides for the passage of cutters, or reamers, and which hollow cylinder is prolonged into a shank to be inserted into an ordinary brace for the purpose of boring holes, and reaming them out at the bottom substantially as shown and described.

7. A reaming tool, comprising the following elements in combination substantially as described, a guide piece adapted to revolve within the hole whose walls are to be reamed out and having inclined guideways, reamers or cutters supported and guided in said guideways and a revolving carrier to which they are flexibly attached, whereby, as the carrier, reamers and guide piece are revolved and the former two fed the reamers are gradually advanced outwardly from the axis of rotation for the purpose described.

In testimony whereof we affix our signatures in presence of two subscribing witnesses.

LOUIS FREDERICK CHARLES RICH.
JOHN HENRY HULL.

Witnesses:
LEONARD M. RIDGWAY,
THOS. SHEARON.